United States Patent
Marshall et al.

(10) Patent No.: US 11,863,660 B2
(45) Date of Patent: Jan. 2, 2024

(54) CONTROLLED-SHARE IDENTITY TRANSPORT STACK

(71) Applicant: Accenture Global Solutions Limited, Dublin (IE)

(72) Inventors: Shane R. Marshall, Crown Point, IN (US); Rodrigo Yukio Ieto, London (GB); Peter Bidewell, London (GB); Julius Christian Quirona Uy, Makati (PH); Lukas Jan Wuttke, Horn-Bad Meinberg (DE)

(73) Assignee: Accenture Global Solutions Limited, Dublin (IE)

( * ) Notice: Subject to any disclaimer, the term of this patent is extended or adjusted under 35 U.S.C. 154(b) by 630 days.

(21) Appl. No.: 16/993,943

(22) Filed: Aug. 14, 2020

(65) Prior Publication Data
US 2021/0050992 A1 Feb. 18, 2021

Related U.S. Application Data

(60) Provisional application No. 62/887,366, filed on Aug. 15, 2019.

(51) Int. Cl.
| *H04L 9/06* | (2006.01) |
| *G06F 12/14* | (2006.01) |
| *H04L 9/32* | (2006.01) |
| *H04L 67/104* | (2022.01) |
| *H04L 9/00* | (2022.01) |

(52) U.S. Cl.
CPC ........ *H04L 9/0637* (2013.01); *G06F 12/1408* (2013.01); *H04L 9/32* (2013.01); *H04L 67/104* (2013.01); *H04L 9/50* (2022.05)

(58) Field of Classification Search
CPC ....... H04L 9/0637; H04L 9/32; H04L 67/104; G06F 12/1408
See application file for complete search history.

(56) References Cited

U.S. PATENT DOCUMENTS

| 9,635,000 | B1 | 4/2017 | Muftic | |
| 2019/0207951 | A1* | 7/2019 | Oberhauser | ........... H04L 9/3236 |
| 2020/0026834 | A1* | 1/2020 | Vimadalal | ........... G06F 16/9024 |
| 2020/0250698 | A1* | 8/2020 | Larimer | ............ G06Q 30/0214 |
| 2020/0265435 | A1* | 8/2020 | Bankston | ........... G06Q 20/4014 |

OTHER PUBLICATIONS

European Search Report of European application 20191159.1, dated Dec. 22, 2020, 8 pages.
Hardjono et al., "DRAFT—Please Do Not Distribute Verifiable Anonymous Identites and Access Control in Permissioned Blockchains", Apr. 17, 2016, retrieved from http://connection.mit.edu/wp-content/uploads/sites/29/2014/12/ChainAnchor-Identities-04172016.

* cited by examiner

*Primary Examiner* — Shanto Abedin
(74) *Attorney, Agent, or Firm* — Crowell & Moring LLP

(57) ABSTRACT

A transport stack may control identity information that may be owned by a user. An information record of the identity information may be stored on a distributed ledger. Transactors may request a viewing-share for the identity information to support transactions with the user. The transport stack may generate a grant record when a transactor is provided with a viewing-share of the identity information. The grant record may be stored on the distributed ledger. The distributed ledger may provide a verifiable record of the identity information content and history of viewing-share grants.

20 Claims, 5 Drawing Sheets

CONTROLLED-SHARE IDENTITY TRANSPORT STACK

PRIORITY

This application claims priority to U.S. Provisional Application Ser. No. 62/887,366, filed Aug. 15, 2019, and entitled Authenticity Transport Stack, which is incorporated by reference in its entirety.

TECHNICAL FIELD

This disclosure relates to a transport stack for controlled shares of identity information.

BACKGROUND

Rapid advances in electronics and communication technologies, driven by immense customer demand, have resulted in the widespread adoption of electronic transactions, record keeping, and data sharing. As one example, e-currencies, such as Bitcoin, have displaced paper currencies in millions of transactions per year. Improvements in tracking and/or knowledge management attached to such electronic transactions will continue to increase the features and options available to operators engaging in electronic transactions.

DETAILED DESCRIPTION

Figure 1:
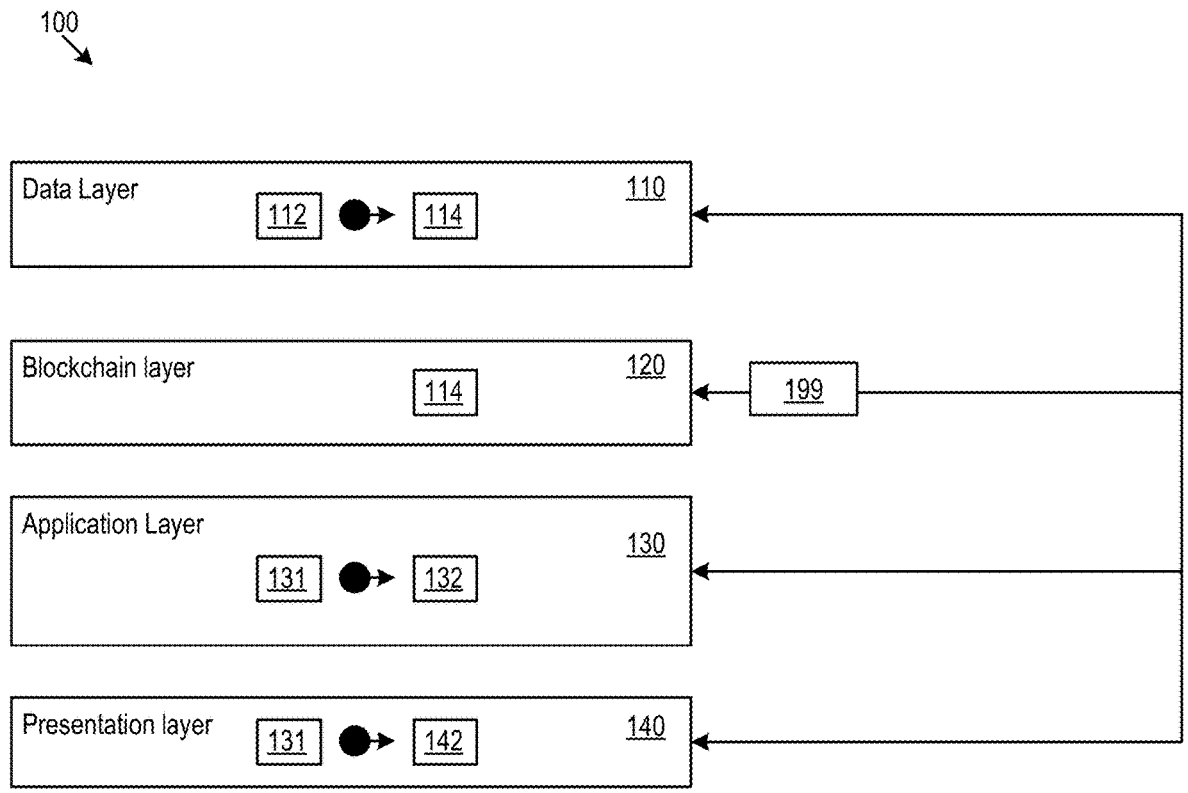
FIG. 1 shows an example transport stack.

A blockchain may include a series of data blocks, the blocks including a code, such as a cryptographic hash or checksum, which may be coding-consistent with the content of previous blocks in the series. In some cases, determining multiple different sets of blocks that produce the same integrity code may be insoluble, prohibitively computationally complex, or otherwise effort intensive enough to frustrate attempts to tamper with the contents of the blockchain while maintaining the self-consistence of the integrity codes. Further, content within the blockchain may be encrypted to control access to selected information stored on the blockchain.

In various systems, commitments and/or other cryptographic primitives may be used to control visibility to data, for example, a commitment may be used to prove a fact about underlying data (e.g. the total number of fulfillment parties appraised of a request) without disclosing the underlying data itself (e.g., the identifications (IDs) associated with the individual fulfillment parties).

In various implementations, blockchain data visibility control may be implemented by applying homomorphic encryption (e.g., a cryptologic technique) to content within the blockchain. The homomorphic encryption may allow sharing of selected data, data details, metadata, and/or other data features without necessarily sharing underlying data from which such selected data features may be derived or later recreated. The underlying blockchain allows participants to verify (e.g., in a trustless or less-than-full trust environment) that the various participants are working from the same underlying data and accordingly working with valid data features.

Homomorphic encryption schemes include a class of multiple different encryption schemes. Homomorphic encryption schemes use a homomorphic property of certain encryption algorithms, e.g., $H_m(x)$, where $H_m$ designates a homomorphic encryption algorithm. The homomorphic property provides that the sum of encrypted values is equal to the value of the encrypted sum of the values, e.g., $H_m(x)+H_m(y)=H_m(x+y)$. This homomorphic property may be used to disclose various features of the underlying data values, e.g., x and y, without disclosing x and y, using various known mathematical results from the homomorphic property.

Cryptographic primitives, including commitments, hashes, and others, may be used to fashion zero-knowledge proofs (ZKPs) for the underlying data (e.g., which establish facts about the underlying data, but do not necessarily disclose it (e.g., the proof may operate with "zero knowledge" of the underlying data)). Accordingly, ZKPs may be used to control visibility (e.g., what data may be viewed/disclosed) to parties. For example, details about request conditions (discussed below) may be disclosed without disclosing all data within the request condition. Additionally or alternatively, public key encryption may be used to control which parties may decrypt and view specific data. Signatures may be used to identify data sources and/or allow parties to endorse data from other sources as if their own.

In various implementations, various ones of the structures and primitives discussed above may be used in the implementation of a distributed ledger. In various implementations, the distributed ledger may include a blockchain, be implemented using a hyperledger fabric, be implemented using an independent hyperledger deployment, be implemented using an open-source distributed ledger protocol, and/or other distributed ledger technologies.

In the context of identity information, such as information associated with government issued identification, certifications, educational credentials, banking details, travel schedules, security credentials, work history, personal data, or other identity information may be controlled/held by a user. For example, such identity information may be used to secure a travel booking.

In some cases, the user may restrict access to the identity information but also wish to have the identity information readily available for sharing when transactions using identity information are desired. Accordingly, a transport stack may be used to effect controlled shares with verifiable access grant records and identity information update tracking.

In some implementations, a transport stack may facilitate the controlled transport (e.g., via viewing-shares) of identity information to transacting parties to support identity-dependent transactions. In an illustrative example, a cloud services provider may upon request provide access to cloud-based compute hardware. However, the cloud services provider may request identity information to verify that the recipient of the cloud services has the identity claimed. Thus, the transport stack may be used to grant viewing-share access to the cloud services provider. The transport stack may memorialize the grant of the viewing-share access which may allow the provider to later substantiate that the provider had proper access when the transaction was initiated. This may protect users from unauthorized/fraudulent use of identity information by clearly demarcating authorized use. Additionally or alternatively, the system may protect legitimate providers from being mistaken for authorized/fraudulent transactors. Records of the identity information and grants may be stored on mutualized data (e.g., data accessible to one or more peer nodes in a peer network) in a distributed ledger.

In various implementations, a viewing-share may include an authorization of access to view and/or use identity information. In some cases, the authorization may be time limited. For example, the viewing-share may only allow viewing for a temporary (and in some cases, defined) duration. Temporary viewing-shares may be enforced through participation rules for a peer network and/or by invalidating transactions using identity information for which a viewing-share has expired. In some cases, rules (such as peer-network participation rules) may bar providers from locally storing identity information to skirt viewing-share restrictions. Further, prevention of local storage of the identity information may promote usage of the most up-to-date information (e.g., recorded within mutualized data on the distributed ledger) rather than potentially stale locally stored information. In some cases, viewing-shares may also describe a purpose for access (in the illustrative example, provision of cloud computing hardware access) to prevent usage of identity information for unrelated purposes not authorized (or potentially not considered) by the user granting access. Accordingly, the transport stack may increase the security of electronically stored personal data.

In some cases, the identity information may not necessarily be self-authenticating. Accordingly, when the identity information is provided by (or on behalf of) a user, the receiver of the identity information may attempt to authenticate the identity information from an authentication source other than the user providing the identity information.

In various implementations, distributed ledger/blockchain technologies may be used to transport the authentication of identity information, while the identity information itself may be still held/controlled by the user (e.g., on a mobile device or other computing device). Accordingly, the conduit for reception of the identity information may still be controlled/owned by the user, but the authentication conduit (e.g., the distributed ledger) may be a multiple-stakeholder controlled/managed environment. Therefore, privacy may still be controlled by the user, but trust may be publicly managed. In an example scenario, a user may provide identity information along with an authentication reference to mutualized data (e.g., data available to one or more distributed ledger peer nodes, in some cases the authentication reference may also provide access credentials to the mutualized data). The receiver of the identity information may use the authentication reference to locate/access the mutualized data on the distributed ledger.

The mutualized data may include authenticity artifacts that establish trust in the identity information. Additionally or alternatively, the receiver of the identity information may make verification efforts that may be recorded as authenticity artifacts in the mutualized data for the identity information. In various implementations, the authenticity artifacts may include reputational components and/or attestation components.

In some implementations, reputational components may catalog verification efforts, by third parties, of the identity information. Accordingly, a record of multiple successful previous verifications may establish trust in the identity information, such that addition verification efforts may be unneeded. The number of such reputational components that establish trust obviating additional verification efforts may vary depending on the nature of the identity information, the nature of the efforts cataloged, the trust/reputation associated the catalogers, the nature of the transaction in which the identity information is being used, and/or other trust factors.

In some implementations, the attestation components may record trusted-identity attestations. Attestation components may include attestations on (e.g., digitally signed) by a party attesting that the identity information is authentic. The trust afforded to the attestation may depend on the identity of the attester. For example, a digital identity associated with an issuing body for the original documentation underlying the identity information may, in some cases, conclusively prove the validity of the identity information. As an illustrative scenario, an attestation signed in accord with a digital identity associated with U.S. Department of State may conclusively prove the authenticity of an image of a U.S. Passport.

FIG. 1 shows an example transport stack 100. In some implementations, a multiple-layer transport stack may be implemented on transport circuitry. The transport stack 100 may include an data layer 110, which may handle data reception/transmission (e.g., extraction, transformation, encapsulation, encapsulation, and/or loading of data) and/or data operations (storage, database access, cloud storage access); a blockchain layer 120, which may handle distributed ledger interactions, such as, peer node recordation requests, ledger data access requests, or other blockchain interactions; an application layer 130, which may handle event/transaction operations such as selection of configuration options, external party interactions, transactions, or other operations; a presentation layer 140, which may handle display of information, interfaces, or other displays.

A stack may refer to a multi-layered computer architecture that defines the interaction of software and hardware resources at the multiple layers. The Open Systems Interconnection (OSI) model is an example of a stack-type architecture. The layers of a stack may pass data and hardware resources among themselves to facilitate stack operations. As one example, for the transport stack, the data layer 110 may provide the application layer with hardware memory operations to access identity data. Hence, the data layer may provide a hardware resource, e.g., hardware memory operations, to the application layer 130. Accordingly, the multiple-layer stack architecture of the transport stack 100 may improve the functioning and/or security of the underlying hardware. In various implementations, a hardware memory operation may include a local storage operation, a database storage operation, a cloud-based storage operation, and/or other memory storage operation.

Figure 2:
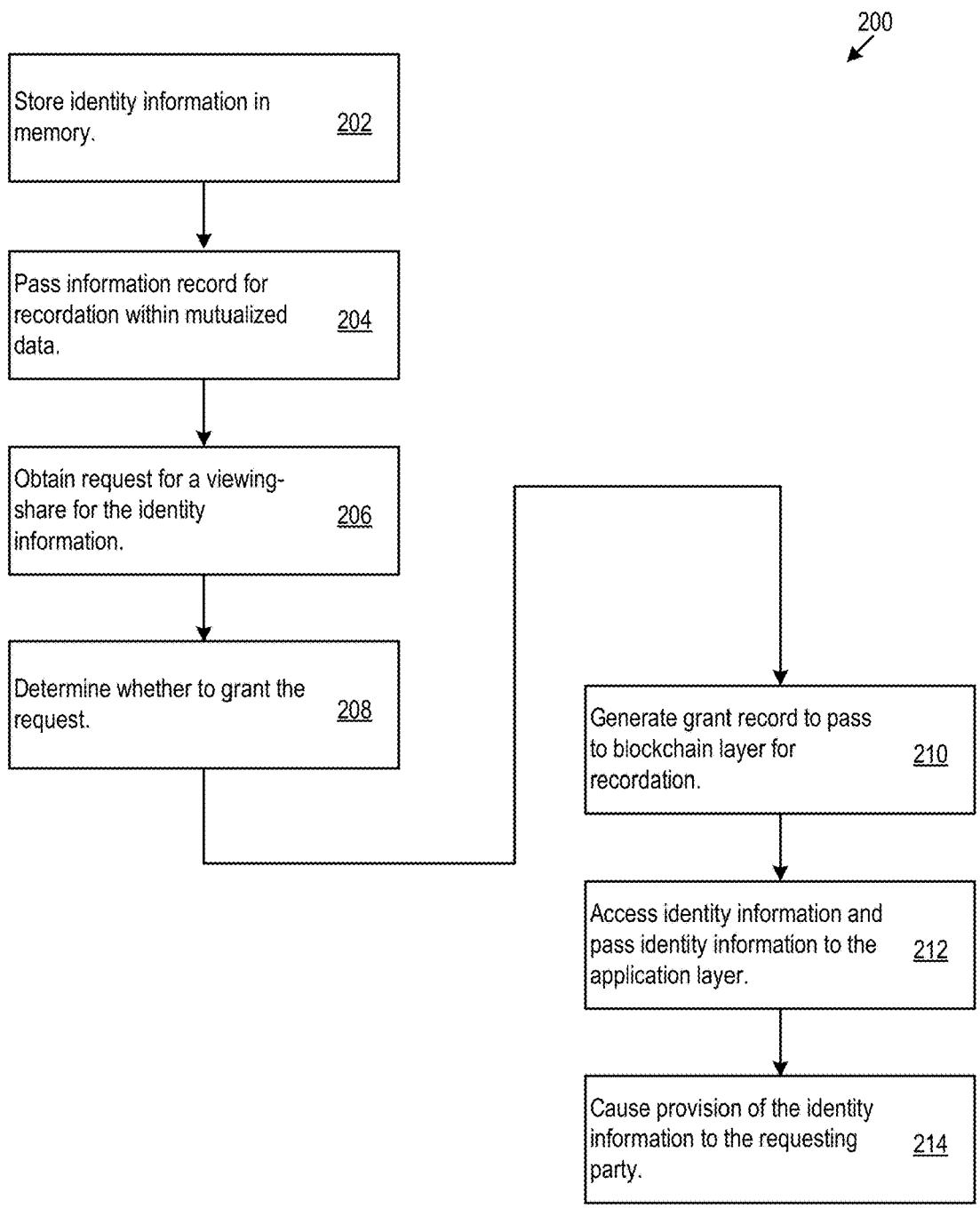
FIG. 2 show example transport logic.

FIG. 2 shows example transport logic (TL) 200. Referring now to FIG. 2 while continuing to refer to FIG. 1, the TL 200 may be executed on transport circuitry to implement the transport stack 100. The TL 200 may, at the data layer 110, store identity information 112 in memory (202, e.g., via a hardware memory operation). The storage of the identity information 112 in some cases, may, be off-ledger. Storage off-ledger (and/or on ledger in an encrypted form) may assist in controlling access to the identity information. For example, storing the identity information 112 in a form or location not accessible to all peer nodes with access to the distributed ledger may facilitate controlled access to the information.

The TL 200 may pass an information record 114 of the identity information 112 to the blockchain layer for recordation within mutualized data on the distributed ledger (204). The immutability of the distributed ledger may still be used to prevent falsification/surreptitious alteration of the identity information through placement of information records on the distributed ledger 199. The information record may, for example include a hash of the identity information. Therefore, if there is a dispute regarding the content of identity information 112 after a transaction, the user can establish the official content of the identity information at the time of the transaction (e.g., by showing that the provided identity information 112 matches the recorded identity information. The party requesting the identity information 112 and or third-party auditors may similarly verify the identity information 112 against ledger record.

At the application layer 130, the TL 200 may obtain a request 131 for a viewing-share for the identity information 112 (206). For example, the TL 200 may receive the request 131 via the distributed ledger 199 or via a network interface. The TL 200 may determine whether to grant the request 131 (208). For example, the TL 200 may access rules (e.g., rules 321, 421 discussed below) to determine if the request 131 should be automatically granted based on user preferences or other information. In some cases, the TL 200, at the presentation layer, may cause generation of a user interface option 142 querying a user for input as to whether the request should be granted. The user may receive a button or other user interface element allowing and/or rejecting the request. The user input may control the TL 200 determination whether or not to grant the request. In some cases, the user interface option 142 may be include an option displayed on a mobile device interface.

In some cases, a constrained set of peer nodes may be able to request a viewing-share. For example, valid requestors may be constrained such that peer nodes (e.g., representing participating parties) in the peer network operating the distributed ledger may request viewing-shares, but non-participating entities (e.g., without peer node representation) may be barred for making valid requests for viewing-shares. In some cases, identity management may be used. In some cases, identities may be used to identify proper participants and any participant may request a viewing-share. In some implementations, the system may constrain the set of allowed requestors such that a subset of participants with specific identities may be allowed to make valid requests.

In various implementations access to the identity information 112 may be controlled by barring disallowed identities from requesting the data, storing the data off-ledger, storing the data in an encrypted form, localizing (e.g., at a memory device controlled by the identity information owner) storage of the identity information, and/or any combination of these and other access control techniques.

When the request is granted, the TL 200 may generate a grant record 132 which may be passed to the blockchain layer for recordation (210). The grant record 132 may be used to later substantiate whether permission was granted for a viewing-share. This may support transaction verification. In some cases, rejections of the request may be memorialized on the distributed ledger. This may allow for the tracking of transactors with high numbers of rejections, which may indicate spam, scams, and/or other nuisances. In some cases, disputes regarding question of whether or not a viewing-share was granted, what content was included in the identity information, and/or other issues of contention may be resolved by generating a resolution message (e.g., using the application layer) that points to the relevant record within the mutualized data that recorded the information under dispute. For example, a dispute regarding whether or not a viewing-share was granted may be resolved by referencing a grant record (or noting an absence of a grant record following a record of a request). In an illustrative example, an information record may be used to resolve a dispute regarding the content of a given item of identity information.

The TL 200 may (at the data layer 110) access the identity information 112 and pass the information to the application layer 130 (212).

The application layer 130 may cause provision of the identity information 112 to the party requesting the identity information 112 (214). Provision may include transfer (e.g., network-based transfer) of the identity information 112 to the requesting party, provision of a decryption key, provision of (temporary) access credentials for an identity information database, encryption of the identity information using a public key of the requesting party or other provision scheme. In some cases, the provision scheme may operate to provide access to the identity information for the requesting party but prevent dissemination of the identity information to other parties.

Figure 3:
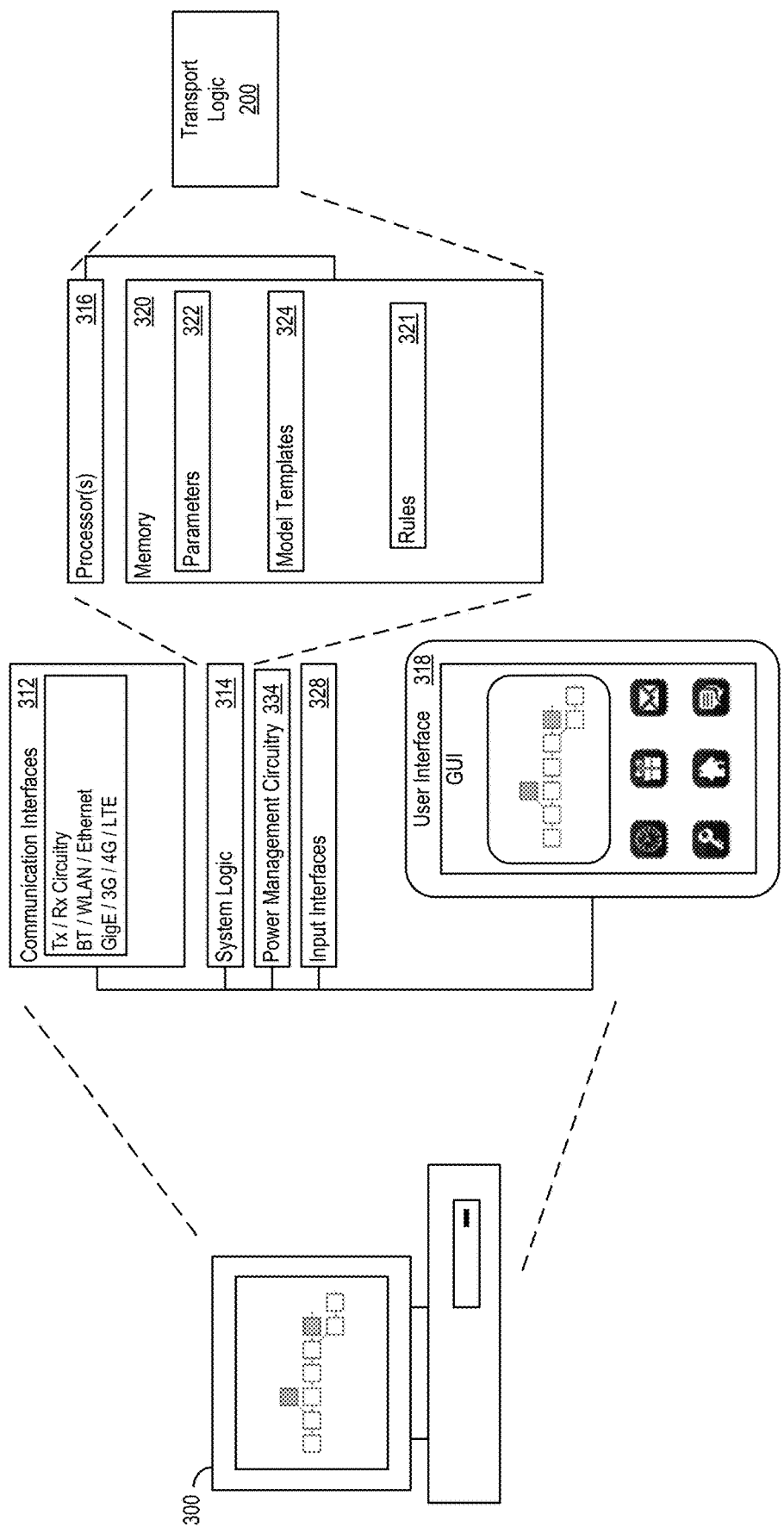
FIG. 3 shows an example execution platform for a distributed ledger peer node that may execute the transport stack.

FIG. 3 shows an example execution environment (EE) 300 for implementing a peer node. The EE 300 may include system logic 314 to support tasks described in the disclosure, including the drawings and/or claims. The system logic 314 may include processors 316, memory 320, and/or other circuitry, which may be used to implement TL 200, which may provide software support to implement the various tasks performed when verifying identity information.

The memory 320 may be used to store parameters 322 and/or model templates 324 used in the verification operation parameters. The memory 320 may further store rules 321, that may facilitate viewing-share controls, implementation of verifications and/or distributed ledger interactions.

The memory 320 may further include applications and structures, for example, coded objects, templates, or one or more other data structures to support verifications and/or distributed ledger interactions. The EE 300 may also include one or more communication interfaces 312, which may support wireless, e.g. Bluetooth, Wi-Fi, WLAN, cellular (3G, 4G, LTE/A), and/or wired, ethernet, Gigabit ethernet, optical networking protocols. The communication interface 312 may support communication, e.g., through the data layer as network interface circuitry, with data sources or resources used to invoke selected action or other parties to facilitate verifications and/or distributed ledger interactions. Additionally or alternatively, the communication interface 312 may support secure information exchanges, such as secure socket layer (SSL) or public-key encryption-based protocols for sending and receiving private data. The EE 300 may include power management circuitry 334 and one or more input interfaces 328.

The EE 300 may also include a user interface 318 that may include man-machine interfaces and/or graphical user interfaces (GUI). The GUI may be used to present interfaces and/or options to operators involved in verifications and/or distributed ledger interactions.

Figure 4:
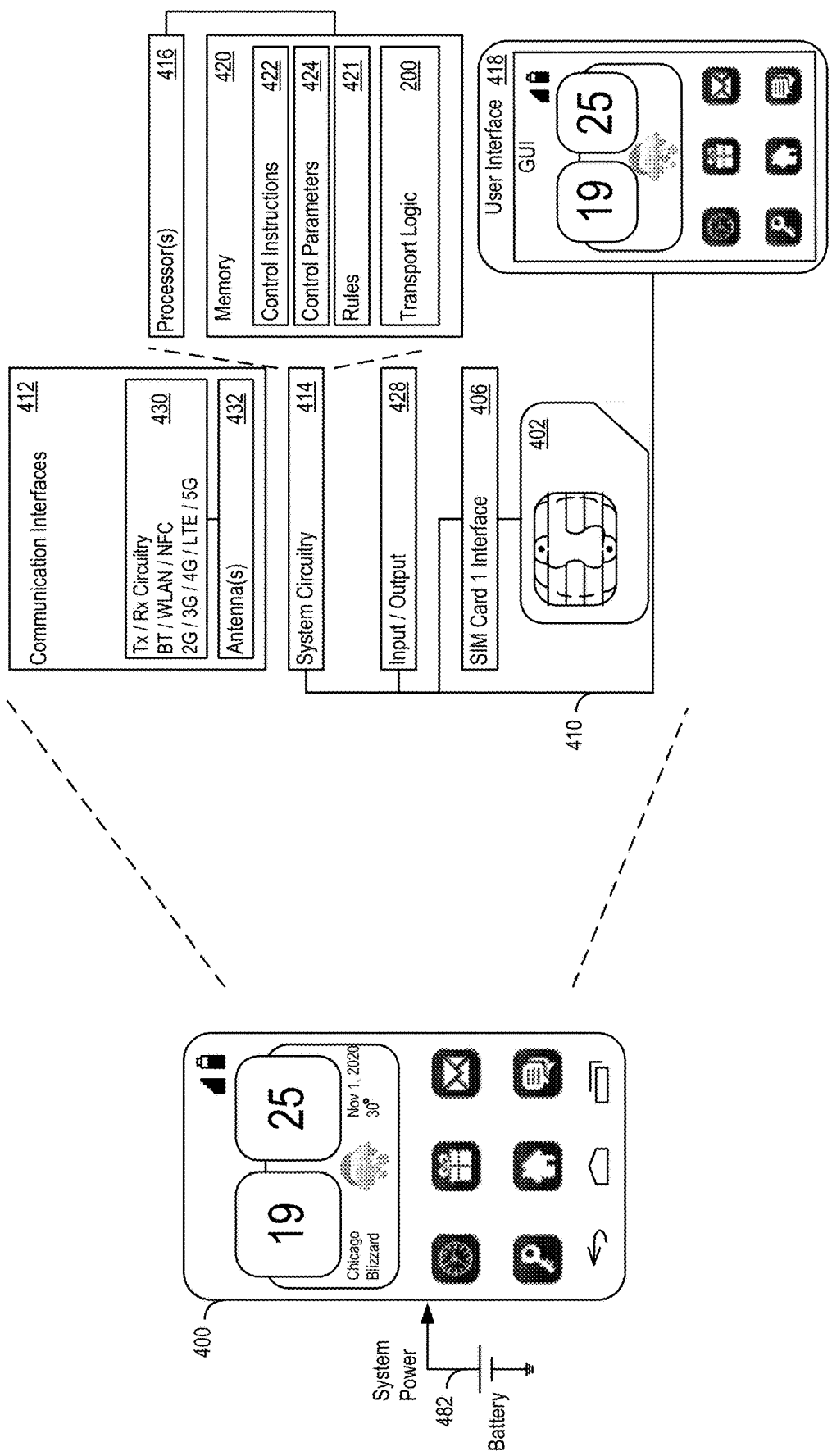
FIG. 4 shows an example execution platform for the transport stack.

FIG. 4 shows an example execution platform (EEP) 400 for the authentication transport stack. The EEP 400 is shown as a mobile device, but in various implementations, other computing devices, such as laptops, servers, virtual machines, distributed computing solutions, hardware executing serverless application, or other hardware devices may serve as the EEP 400. In this example, the EEP 400 supports one or more Subscriber Identity Modules (SIMs), such as the SIM1 402. Electrical and physical interface 406 connects SIM1 402 to the rest of the user equipment hardware, for example, through the system bus 410.

The EEP 400 includes communication interfaces 412, system logic 414, and a user interface 418. The system logic 414 may include any combination of hardware, software, firmware, or other logic. The system logic 414 may be implemented, for example, with one or more systems on a chip (SoC), application specific integrated circuits (ASIC), discrete analog and digital circuits, and other circuitry. The system logic 414 is part of the implementation of any desired functionality in the EEP 400. In that regard, the system logic 414 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 418. The user interface 418 and the inputs 428 may include a graphical user interface, touch sensitive display, haptic feedback or other haptic output, voice or facial recognition inputs, buttons, switches, speakers and other user interface elements. Additional examples of the inputs 428 include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

The system logic 414 may include one or more processors 416 and memories 420. The memory 420 stores, for example, control instructions 422 that the processor 416 executes to carry out desired functionality for the EEP 400. The control parameters 424 provide and specify configuration and operating options for the control instructions 422. The memory 420 may also store any BT, WiFi, 3G, 4G, 5G or other data 426 that the EEP 400 will send, or has received, through the communication interfaces 412. The memory may store rules 421 that may facilitate viewing-share controls, implementation of verifications and/or distributed ledger interactions The memory 420 may further include TL 200 which may execute various functions and operations of the transport stack.

In various implementations, the system power may be supplied by a power storage device, such as a battery 482.

In the communication interfaces 412, Radio Frequency (RF) transmit (Tx) and receive (Rx) circuitry 430 handles transmission and reception of signals through one or more antennas 432. The communication interface 412 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 412 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

Example Implementation

Figure 5:
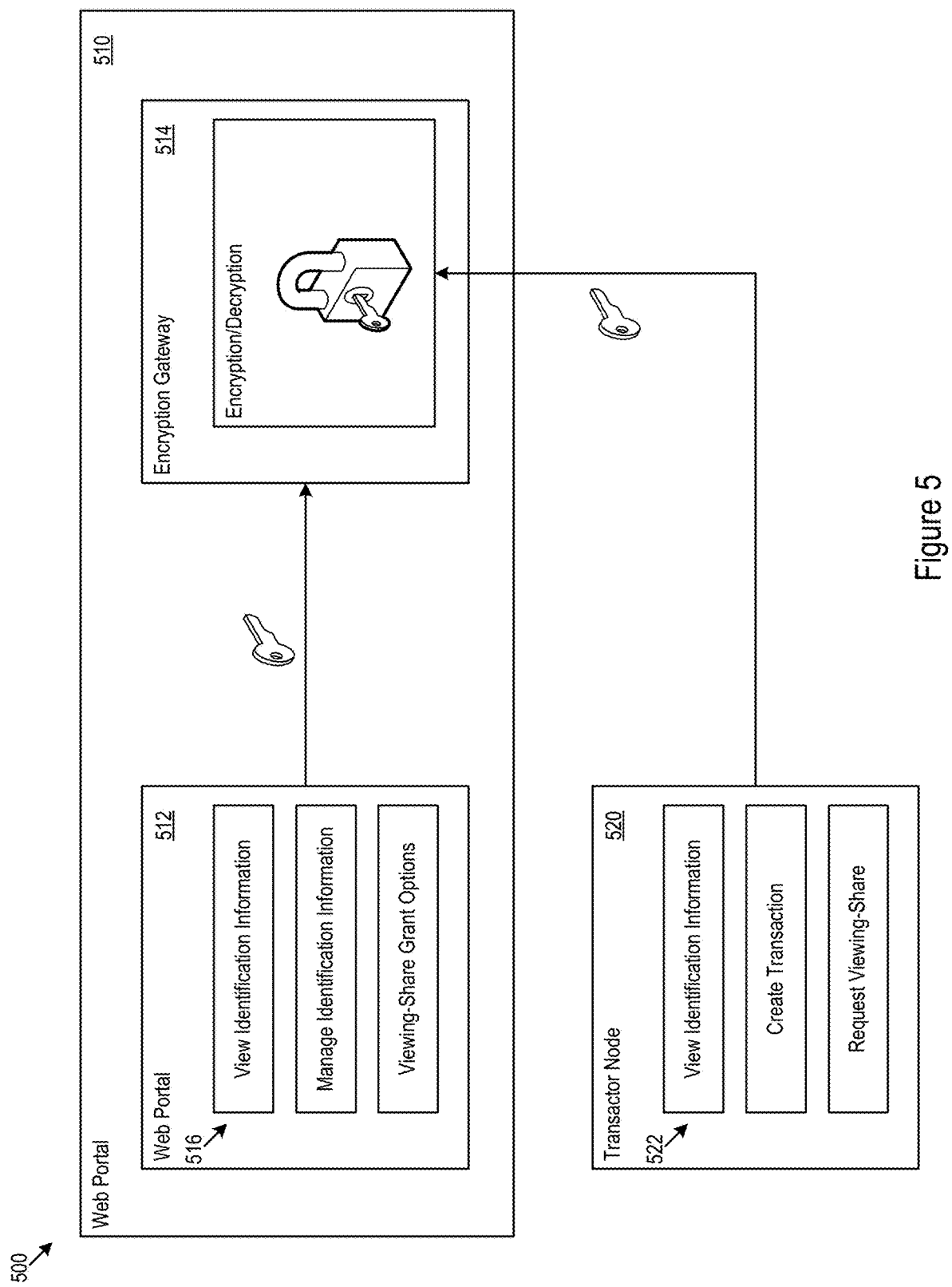
FIG. 5 shows an example interaction environment for the transport stack.

FIG. 5 shows an example interaction environment 500 for the transport stack. In the example interaction environment 500 an example transport stack may be implemented (at least in part) via a web portal 512 and an encryption gateway 514 on an enterprise platform 510. Via the web portal 512, users may manage and view their identification information and execute controls for granting access to viewing-shares through interface tools 516. Using the encryption gateway 514 users may gain access to their own data in decrypted forms. In some cases, the enterprise platform 510 may provide a "wallet" with identification that may used and managed with a high degree of portability (both across devices and geography). For example, the portability of the wallet may lend itself to travel applications such as airline or hotel bookings.

Transactors may access granted viewing-shares of the identity information from transactor nodes 520. The transactor nodes 520 may route communications through the encryption gateway 514 for decrypted access to the identity information (e.g., for which the transactors was granted a viewing-share). The transactor node 520 may provide interface tools 522 for viewing identity information and creating new transaction data or access history records for the identity information. Further, the interface tools 522 may support creation of requests for identity information.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be embodied as a signal and/or data stream and/or may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may particularly include a storage medium and instructions stored in or on the medium, and the instructions when executed by the circuitry in a device may cause the device to implement any of the processing described above or illustrated in the drawings.

The implementations may be distributed as circuitry, e.g., hardware, and/or a combination of hardware and software among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

E1 In an example, a method includes: at a data layer of a transport stack executing on transport circuitry: storing, in memory, identity information via memory operation; passing an information record of the identity information to a blockchain layer for provision to a distributed network for recordation within mutualized data on a distributed ledger; accessing the identity information in the memory; and after accessing the identity information, passing the identity information to an application layer of the transport stack; at the application layer of the transport stack: obtaining a request for a viewing-share of the identity information to substantiate an identity-dependent transaction; determining whether to grant the request; at a time that the request is granted: generating a grant record of the grant; passing the grant record to the blockchain layer; and causing provision of the identity information to fulfill the request; and at the blockchain layer of the transport stack, initiating collection of mutualized data by: causing the information record to be recorded on the distributed ledger; and causing the grant record to be recorded on the distributed ledger.

E2 In an example, a method includes: at a data layer of a transport stack executing on transport circuitry: storing, in memory, identity information via memory operation; accessing the identity information in the memory; and after accessing the identity information, passing the identity information to an application layer of the authenticity transport stack; at a blockchain layer of the transport stack, initiating collection of mutualized data on a distributed ledger, the mutualized data including an authenticity artifact establishing at least in part authenticity of the identity information; and at the application layer, serving the identity information and an authentication reference to a query node operating on behalf of a requesting party, the authentication reference configured to facilitate authentication of the identity information via the mutualized data on the distributed ledger.

E3 The method of either of examples E1 or E2, where: the information record is based on the most recent version of the identity information at the time the information record is recorded on the distributed ledger; and the method further includes, at the application layer, executing a dispute resolution by generating a resolution message pointing to the information record.

E4 The method of any of examples E1-E3, where the grant record includes an expiration date after which the viewing-share of the identity information expires.

E5 The method of any of examples E1-E4, where determining whether to grant the request includes: at a presentation layer of the transport stack, causing generation of an user interface option to grant or reject the request; and obtaining, via input at the user interface option and at the application layer, an instruction to grant or reject the request.

E6 The method of claim E5 or any of examples E1-E4, where the user interface option includes an option on a mobile device user interface.

E7 The method of any of examples E1-E6, where the identity information is controlled privately by circumscribing the identities authorized to request a viewing-share the identity information.

E8 The method of claim E7 or any of examples E1-E6, where circumscribing the identities includes: maintaining a list of authorized identities; blocking access to the memory by unauthorized identities; localizing the memory on a specific device; blocking access to the memory by devices not associated with an authorized identity; or any combination of the foregoing.

E9 The method of any of examples E1-E8, where: the mutualized data further includes an authenticity artifact establishing at least in part authenticity of the identity information; and the method further includes, at the application layer, serving the identity information and an authentication reference in response to the request, the authentication reference configured to point to the authenticity artifact within the mutualized data.

E10 The method of any of examples E1-E9, where the authentication artifact includes a reputational component, the reputational component memorializing a previous verification effort by a peer node, the previous verification effort corresponding to the identity information.

E11 The method of any of examples E1-E10, where the authentication artifact includes an attestation component, the attestation component memorializing a trusted-identity attestation to the authenticity of the authenticatable-identity information.

E12 The method of claim E11 or any of examples E1-E10, where the trusted-identity attestation includes an attestation by: an identity associated with a party that issued the authenticatable-identity information; an identity associated with a party that regulates the authenticatable-identity information; an identity associated with a party that administers the authenticatable-identity information; an identity associated with a party that enforces the authenticatable-identity information; an identity associated with a governmental body; an identity associated with a private credentialing authority; an identity associated with an educational institution; an identity associated with any party providing certification, verification, credentials, background checks, status updates, authenticity confirmation, or other confirmation; or any combination of the foregoing.

E13 The method of any of examples E1-E12, where the mutualized data is accessible by one or more peer nodes of the distributed ledger, where access by the peer nodes is controlled using identity-based membership in a peer node group.

E14 The method of any of examples E1-E13, where the distributed ledger includes: a blockchain; a hyperledger fabric; an independent hyperledger deployment; an open-source distributed ledger protocol; or any combination of the foregoing.

E15 The method of any of examples E1-E14, where the authenticatable-identity information is controlled privately.

E16 The method of any of examples E1-E15, where the application layer generates an authentication reference that identifies the mutualized data and authenticates the identity information.

E17 The method of any of examples E1-E16, where the mutualized data is accessible by one or more peer nodes of the distributed ledger, where: optionally, the mutualized data is accessible by all peer nodes of the distributed ledger; and optionally, peer nodes access is controlled by identity-based membership in a peer node group.

E18 The method of any of examples E1-E17, where the mutualized data includes multiple authenticity artifacts, where: optionally, multiple ones of the multiple authenticity artifacts are associated with the identity information; and optionally, at least one of the multiple authenticity artifacts is associated with information other than the identity information, where optionally, the information other than the identity information includes different authenticatable-identity information.

E19 The method of any of examples E1-E18, where: the mutualized data includes multiple authenticity artifacts; and the multiple authenticity artifacts include multiple reputational components associated with a respective distinct previous verification effort for the identity information, where: optionally, each of the distinct previous verification efforts increases a trust level for the identity information.

E20 The method of any of examples E1-E19, where the distributed ledger includes: a blockchain; a hyperledger fabric; a hyperledger indy deployment; an open-source distributed ledger protocol; or any combination of the foregoing.

E21 The method of any of examples E1-E20, where the identity information is used to support an online travel booking.

E22 The method of any of examples E1-E21, further including, at a presentation layer of the authenticity transport stack, causing display, on a display or other interface, of: the identity information; options for services or goods being obtained using the authenticatable-identity information; sharing controls for the identity information; management options the identity information; other options associated with the identity information; or any combination of the foregoing.

E23 The method of any of examples E1-E22, where the application layer generates an authentication reference provides access to the mutualized data and authenticates the identity information.

E24 In an example a method includes, authenticating the identity of any of examples E1-E23, where: optionally, the authenticating is performed at a peer node associated with the distributed ledger; optionally, the authenticating includes performing a verification effort and causing recordation of the verification effort to the distributed ledger as an authentication artifact; optionally, the authenticating includes accessing a reputational component of an authentication artifact and reviewing a previous verification effort; optionally, the authenticating includes causing recordation, to the distributed ledger, of an attestation component of an authentication artifact; and optionally, the authenticating includes accessing an attestation component of an authentication artifact and reviewing a trusted-identity attestation.

E25 In an example, a system includes: memory; transport circuitry in data communication with the memory, the transport circuitry configured to execute a transport stack by: at data layer of the transport stack: storing, in the memory, identity information via memory operation; passing an information record of the identity information to a blockchain layer for provision to a distributed network for recordation within mutualized data on a distributed ledger; accessing the identity information in the memory; and after accessing the identity information, passing the identity information to an application layer of the transport stack; at the application layer of the transport stack: obtaining a request for a viewing-share of the identity information to substantiate an identity-dependent transaction; determining whether to grant the request; at a time that the request is granted: generating a grant record of the grant; passing the grant record to the blockchain layer; and causing provision of the identity information to fulfill the request; and at the blockchain layer of the transport stack, initiating collection of mutualized data by: causing the information record to be recorded on the distributed ledger; and causing the grant record to be recorded on the distributed ledger.

E26 The method of example E25, where: the information record is based on the most recent version of the identity information at the time the information record is recorded on the distributed ledger; and the transport circuitry is further configured to execute a transport stack by: at the application layer, executing a dispute resolution by generating a resolution message pointing to the information record.

E27 The system of either of examples E25 or E26, where the grant record includes an expiration date after which the viewing-share of the identity information expires.

E28 The system of any of examples E25-E27, where determining whether to grant the request includes: at a presentation layer of the transport stack, causing generation of an user interface option to grant or reject the request; and obtaining, via input at the user interface option and at the application layer, an instruction to grant or reject the request.

E29 In an example, a product includes: machine-readable media other than a transitory signal; and instructions stored on the machine-readable media, the instructions configured to, when executed, cause transport circuitry to execute a transport stack by: at data layer of the transport stack: storing, in memory, identity information via memory operation; passing an information record of the identity information to a blockchain layer for provision to a distributed network for recordation within mutualized data on a distributed ledger; accessing the identity information in the memory; and after accessing the identity information, passing the identity information to an application layer of the transport stack; at the application layer of the transport stack: obtaining a request for a viewing-share of the identity information to substantiate an identity-dependent transaction; determining whether to grant the request; at a time that the request is granted: generating a grant record of the grant; passing the grant record to the blockchain layer; and causing provision of the identity information to fulfill the request; and at the blockchain layer of the transport stack, initiating collection of mutualized data by: causing the information record to be recorded on the distributed ledger; and causing the grant record to be recorded on the distributed ledger.

E30 The product of example E29, where the identity information is controlled privately by circumscribing the identities authorized to request a viewing-share the identity information.

E31 The product of example E30 or example E29, where circumscribing the identities includes: maintaining a list of authorized identities; blocking access to the memory by unauthorized identities; localizing the memory on a specific device; blocking access to the memory by devices not associated with an authorized identity; or any combination of the foregoing.

E32 In an example, a system is configured to implement any of or any combination of the features described in the preceding examples or disclosure.

E33 In an example, a method includes implementing any of or any combination of the features described in the preceding examples or disclosure.

E34 In an example, a product includes: machine-readable media; instructions stored on the machine-readable media, the instructions configured to cause a machine to implement any of or any combination of the features described in the preceding examples or disclosure.

E35 The product of example E34, where: the machine-readable media is other than a transitory signal; and/or the instructions are executable.

Headings and/or subheadings used herein are intended only to aid the reader with understanding described implementations.

What is claimed is:

1. A method including:
   at a data layer of a transport stack executing on transport circuitry:
   storing, in memory, identity information via memory operation;
   passing an information record of the identity information to a blockchain layer for provision to a distributed network for recordation within mutualized data on a distributed ledger;
   accessing the identity information in the memory; and
   after accessing the identity information, passing the identity information to an application layer of the transport stack;
   at the application layer of the transport stack:
   obtaining a request for a viewing-share of the identity information to substantiate an identity-dependent transaction;
   determining whether to grant the request;
   at a time that the request is granted:
   generating a grant record of the grant;
   passing the grant record to the blockchain layer; and
   causing provision of the identity information to fulfill the request; and
   at the blockchain layer of the transport stack, initiating collection of mutualized data by:
   causing the information record to be recorded on the distributed ledger; and
   causing the grant record to be recorded on the distributed ledger.

2. The method of claim 1, where:
   the information record is based on a most recent version of the identity information at the time the information record is recorded on the distributed ledger; and
   the method further includes, at the application layer, executing a dispute resolution by generating a resolution message pointing to the information record.

3. The method of claim 1, where the grant record includes an expiration date after which the viewing-share of the identity information expires.

4. The method of claim 1, where determining whether to grant the request includes:
   at a presentation layer of the transport stack, causing generation of an user interface option to grant or reject the request; and
   obtaining, via input at the user interface option and at the application layer, an instruction to grant or reject the request.

5. The method of claim 4, where the user interface option includes an option on a mobile device user interface.

6. The method of claim 1, where the identity information is controlled privately by circumscribing identities authorized to request a viewing-share the identity information.

7. The method of claim 6, where circumscribing the identities includes:
   maintaining a list of authorized identities;
   blocking access to the memory by unauthorized identities;
   localizing the memory on a specific device;
   blocking access to the memory by devices not associated with an authorized identity; or
   any combination of the foregoing.

8. The method of claim 1 where:
   the mutualized data further includes an authenticity artifact establishing at least in part authenticity of the identity information; and
   the method further includes, at the application layer, serving the identity information and an authentication reference in response to the request, the authentication reference configured to point to the authenticity artifact within the mutualized data.

9. The method of claim 8, where the authentication artifact includes a reputational component, the reputational component memorializing a previous verification effort by a peer node, the previous verification effort corresponding to the identity information.

10. The method of claim 8, where the authentication artifact includes an attestation component, the attestation component memorializing a trusted-identity attestation to authenticity of the authenticatable-identity information.

11. The method of claim 10, where the trusted-identity attestation includes an attestation by:
    an identity associated with a party that issued the authenticatable-identity information;
    an identity associated with a party that regulates the authenticatable-identity information;
    an identity associated with a party that administers the authenticatable-identity information;
    an identity associated with a party that enforces the authenticatable-identity information;
    an identity associated with a governmental body;
    an identity associated with a private credentialing authority;
    an identity associated with an educational institution;
    an identity associated with any party providing certification, verification, credentials, background checks, status updates, authenticity confirmation, or other confirmation; or
    any combination of the foregoing.

12. The method of claim 1, where the mutualized data is accessible by one or more peer nodes of the distributed ledger, where access by the peer nodes is controlled using identity-based membership in a peer node group.

13. The method of claim 1, where the distributed ledger includes:
    a blockchain;
    a hyperledger fabric;
    an independent hyperledger deployment;
    an open-source distributed ledger protocol; or
    any combination of the foregoing.

14. A system including:
    memory;
    transport circuitry in data communication with the memory, the transport circuitry configured to execute a transport stack by:
    at data layer of the transport stack:
    storing, in the memory, identity information via memory operation;
    passing an information record of the identity information to a blockchain layer for provision to a distributed network for recordation within mutualized data on a distributed ledger;
    accessing the identity information in the memory; and after accessing the identity information, passing the identity information to an application layer of the transport stack;

at the application layer of the transport stack:
obtaining a request for a viewing-share of the identity information to substantiate an identity-dependent transaction;
determining whether to grant the request;
at a time that the request is granted:
generating a grant record of the grant;
passing the grant record to the blockchain layer; and
causing provision of the identity information to fulfill the request; and at the blockchain layer of the transport stack, initiating collection of mutualized data by:
causing the information record to be recorded on the distributed ledger; and
causing the grant record to be recorded on the distributed ledger.

15. The system of claim 14, where:
the information record is based on a most recent version of the identity information at the time the information record is recorded on the distributed ledger; and
the transport circuitry is further configured to execute a transport stack by: at the application layer, executing a dispute resolution by generating a resolution message pointing to the information record.

16. The system of claim 14, where the grant record includes an expiration date after which the viewing-share of the identity information expires.

17. The system of claim 14, where determining whether to grant the request includes:
at a presentation layer of the transport stack, causing generation of an user interface option to grant or reject the request; and
obtaining, via input at the user interface option and at the application layer, an instruction to grant or reject the request.

18. A product including:
machine-readable media other than a transitory signal; and
instructions stored on the machine-readable media, the instructions configured to, when executed, cause transport circuitry to execute a transport stack by:

at data layer of the transport stack:
storing, in memory, identity information via memory operation;
passing an information record of the identity information to a blockchain layer for provision to a distributed network for recordation within mutualized data on a distributed ledger;
accessing the identity information in the memory; and
after accessing the identity information, passing the identity information to an application layer of the transport stack;

at the application layer of the transport stack:
obtaining a request for a viewing-share of the identity information to substantiate an identity-dependent transaction;
determining whether to grant the request;
at a time that the request is granted:
generating a grant record of the grant;
passing the grant record to the blockchain layer; and
causing provision of the identity information to fulfill the request; and at the blockchain layer of the transport stack, initiating collection of mutualized data by:
causing the information record to be recorded on the distributed ledger; and
causing the grant record to be recorded on the distributed ledger.

19. The product of claim 18, where the identity information is controlled privately by circumscribing identities authorized to request a viewing-share the identity information.

20. The product of claim 19, where circumscribing the identities includes:
maintaining a list of authorized identities;
blocking access to the memory by unauthorized identities;
localizing the memory on a specific device;
blocking access to the memory by devices not associated with an authorized identity; or
any combination of the foregoing.

* * * * *